United States Patent
Bugenhagen et al.

(10) Patent No.: US 7,689,166 B2
(45) Date of Patent: Mar. 30, 2010

(54) SYSTEM AND METHOD FOR EXTENSION OF WIRELESS FOOTPRINT

(75) Inventors: Michael K. Bugenhagen, Olathe, KS (US); Carl M. Coppage, Kansas City, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 665 days.

(21) Appl. No.: 11/607,576

(22) Filed: Nov. 30, 2006

(65) Prior Publication Data

US 2008/0132164 A1 Jun. 5, 2008

(51) Int. Cl.
*H04B 7/15* (2006.01)
*H04B 7/14* (2006.01)
(52) U.S. Cl. .............................. 455/11.1; 455/7; 455/16
(58) Field of Classification Search .................. 455/7, 455/11.1, 15, 16, 10
See application file for complete search history.

(56) References Cited

U.S. PATENT DOCUMENTS

| | | | | |
|---|---|---|---|---|
| 4,882,765 A | * | 11/1989 | Maxwell et al. | 455/18 |
| 5,548,802 A | * | 8/1996 | Barnes et al. | 455/15 |
| 5,815,799 A | * | 9/1998 | Barnes et al. | 455/15 |
| 6,404,775 B1 | * | 6/2002 | Leslie et al. | 370/466 |
| 6,957,042 B2 | * | 10/2005 | Williams | 455/7 |

* cited by examiner

*Primary Examiner*—Tilahun Gesesse
(74) *Attorney, Agent, or Firm*—Sonnenschein Nath & Rosenthal LLP

(57) ABSTRACT

A system and method for communicating through a host repeater. Data is received from a remote repeater communicating with a wireless device. The host repeater registers as the wireless device on a wireless network. The data is reformatted for transmission between the wireless devices and the wireless network.

15 Claims, 7 Drawing Sheets

Repeater System
100

SYSTEM AND METHOD FOR EXTENSION OF WIRELESS FOOTPRINT

BACKGROUND

Wireless communications have become more prevalent in recent years. Many wireless users employ wireless devices to communicate for both business and personal use. Wireless communications are particularly useful because of the general availability and lack of geographic limitations or constraints imposed upon the wireless user. As a result, wireless users have become very dependent on wireless access. In most cases, wireless users expect adequate coverage without limitations.

Unfortunately, most wireless providers have limited coverage based on radio frequency range, geographic location, cost, available carriers, and other factors. For example, some wireless users in mountainous regions may have difficulty accessing a wireless signal due to the terrain. In another example, despite numerous cell towers and repeaters broadcasting wireless signals there may still be locations between the broadcast devices that have inadequate wireless access otherwise known as a "dead spot". A wireless user in a "dead spot" has limited or non-existent wireless access. Large numbers of dead spots may be particularly frustrating for wireless users dependent on wireless communications.

In other cases, wireless service providers may not have roaming or support agreements or may have limited or no wireless coverage internationally. As a result, a wireless user that is traveling may need to seek alternative methods of communication that are often inconvenient and costly. Despite an increase in coverage agreements and improving technology, unavailability of wireless access continues to be a problem for wireless users.

SUMMARY

The illustrative embodiments provide a method and system for extension of a wireless footprint. The use of such a system provides a user access to a home cellular network event from a remote geographic location. One embodiment includes a method for communicating through a host repeater. Data is received from a remote repeater communicating with a wireless device. The host repeater registers as the wireless device on a wireless network. Data is reformatted for transmission between the wireless devices and the wireless network.

Another embodiment includes a system for communicating through a remote repeater. The system includes at least one remote repeater operable to communicate with a client over a first wireless network. The remote repeater emulates a wireless access point configured to communicate with the client. The remote repeater is operable to convert data received from the client from a first format to a second format. The system further includes a host repeater operable to communicate with the remote repeater over a wired network communicate with a cellular network over a second wireless network, receive the packets from the remote repeater, and convert the data from the second format to the first format. The host repeater is operable to emulate the client and transmit the data to the cellular network.

Yet another embodiment includes a method for communicating through a host repeater. The method includes receiving a session request from a remote repeater. The remote repeater communicates with a wireless device through a first wireless network. The host repeater registers as the wireless device on a second wireless network using registration information associated with the wireless device. Data from the host repeater is communicated to the remote repeater over a wired network.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments of the present invention provide a system and method for extension of a wireless footprint. The illustrative embodiments extend the available access of a wireless device by creating a split wireless repeater function to carry the communications of a wireless device over wired facilities using Internet protocols or other available network connectivity to a desired wireless network location. The wireless device or client may be a cell phone, personal digital assistant, laptop, or other wireless communication device that sends and receives information through a wireless communications network. Voice, text, data, and other analog or digital communications are herein referred to as data. In general a host repeater registers itself as the wireless device based on communication between the host repeater, a remote repeater and the wireless device. The host repeater then rebroadcasts packets received from the wireless device in order to transmit data as if the host repeater is the wireless device. For example, a wireless user may make a phone call from a home cellular network even though the wireless user is in a location without access to the home cellular network.

As used herein, the term "convert" and terms that are variations or forms thereof shall mean any modification, derivative, abridgement, extension, addition, transformation, translation, mapping, encapsulation, removal of capsulation, or other change to the header or payload portions of any packet, cell, slot, frame, channel, signal or other portion, grouping, or other communication of data. As used herein, "format" means any structure, language, protocol, model, arrangement, or other organization of data. For example, converting the format of data may include encapsulating data into a packet and creating a header to make such data consistent with an IP protocol. It may also include removing an IP protocol packet header from such a packet. Alternatively, data having a first format can be mapped or translated into a second format using a rules-based engine, mapping engine, or parsing and identification process.

Figure 1:
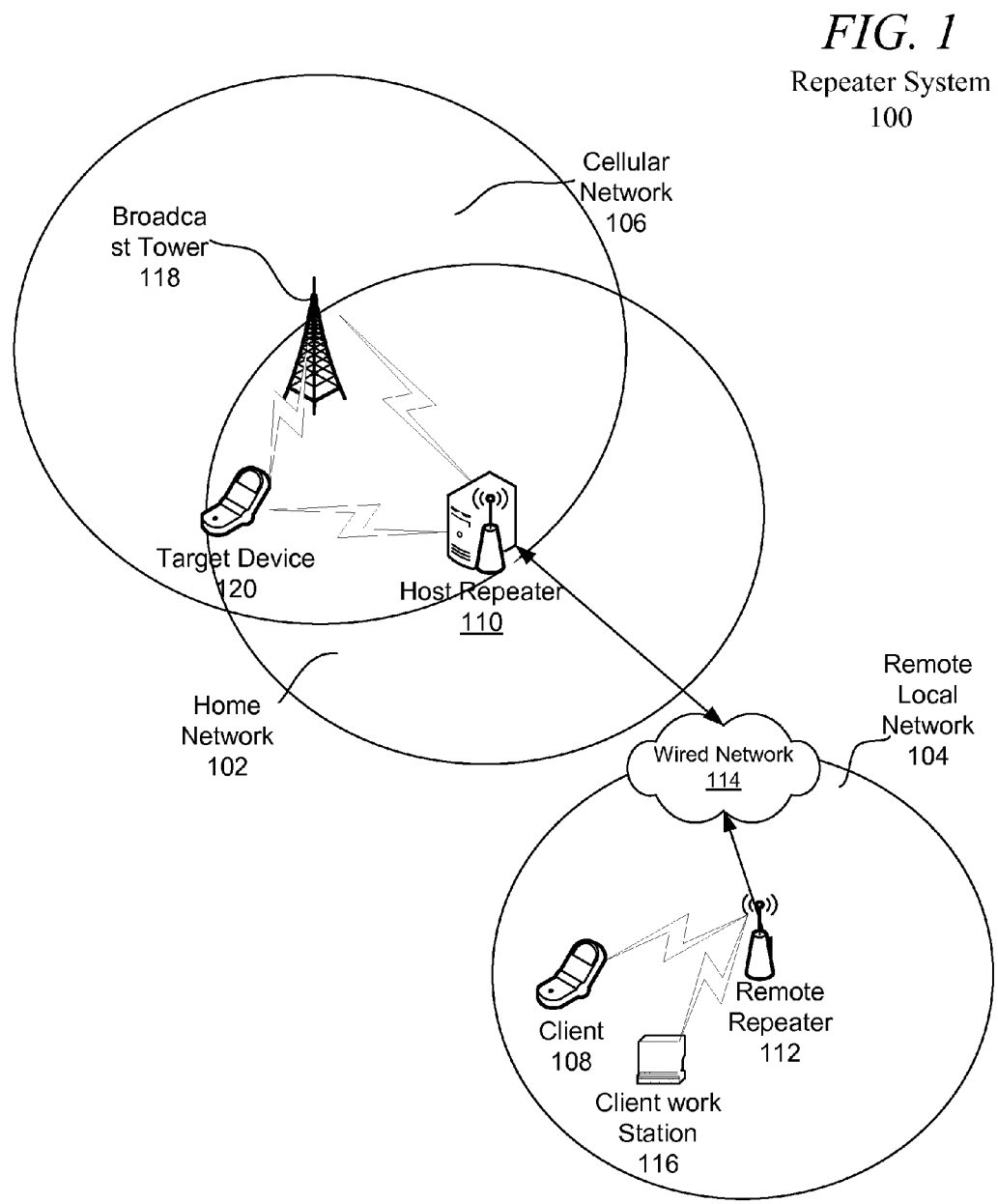
FIG. 1 is an illustration of one embodiment of an Internet Protocol based cell phone repeater system for providing extended communication coverage to a wireless user.

FIG. 1 is an illustration of one embodiment of a repeater system for providing extended communication coverage to a wireless user. The repeater system 100 of FIG. 1 is used to allow a wireless user to communicate from a remote location. FIG. 1 illustrates networks including a home network 102, a remote local network 104, a cellular network 106, and a wired network 114. The repeater system also includes a client 108, a host repeater, 110, a remote repeater 112, a client work station 116, a broadcast tower 118, and a target device 120.

In one embodiment, the home network 102 is the wireless network servicing the location most frequently accessed by the wireless user. However, the home network 102 may be any other wireless network accessed by the wireless user. For example, the home network 102 may be a WiFi or other suitable wireless network used at home, work, or school by the wireless user. The home network 102 may be broadcast by the host repeater 110, or any base station or other suitable device not illustrated herein located within a range suitable for communication with the host repeater 110. In one embodiment, the host repeater 110 is a personal computer with a wireless transceiver. However, the host repeater 110 may be any suitable data processing device including a wireless router, or otherwise be in communication with a wireless transceiver suitable for establishing a wireless network. The host repeater 110 may use WiMAX™, Evolution Data Optimized (EVDO), WiFi, or other wireless network protocols suitable for wireless communications.

The remote local network 104 is a wireless network accessible to the wireless user in his or her current geographic location. In one embodiment, the remote local network 104 is broadcast from the remote repeater 112 and communicates with the wired network 114. The remote local network 104 and the home network 102 may be a WiFi network that uses IEEE standard 802.11 or other suitable wireless standards. The client 108 is a wireless device enabled to send and receive data using any of these wireless protocols. For example, the client 108 may be a cell phone that may access the cellular network 106 and the remote local network 104.

In one example, the remote local network 104 may be a wireless network broadcast from the remote repeater 112 provided for guests at a hotel in Hong Kong. Alternatively, the wireless user may have brought a laptop with a wireless transceiver that is established as the remote repeater 112. In one embodiment, the remote repeater 112 is a wireless transceiver interconnected to the wired network 114. However, the host repeater 112 may be any suitable data processing device including a wireless router, or otherwise be in communication with a wireless transceiver suitable for establishing a wireless network. The remote repeater 112 may also be interconnected to the client workstation 116.

In another embodiment, the remote repeater 112 and the client work station 116 are integrated devices, such as a laptop with a wireless transceiver, which may be used to communicate with the client 108. In one embodiment, the cellular network 106 is a wireless radio frequency network that transmits and receives data through a broadcast tower 118. However, the cellular network 106 may be a cellular or other personal communication system network suitable for communications with wireless clients. The networks shown in repeater system 100 are shown as examples. Any number and type of networks, such as global system for mobile communication (GSM) and code division multiple access (CDMA) networks, may be used to implement the methods described by the illustrative embodiments of the present invention.

In one embodiment, the wired network 114 may be the collection of networks commonly referred to as "the Internet". However, the wired network 114 may be any collection of public and private networks suitable for sending data. A wireless user may use the client 108 to send and receive phone calls, text messages, and other communications. As shown in FIG. 1, the client 108 is outside the range of the cellular network 106 and as a result does not have access to normal cellular or wireless coverage.

The illustrative embodiments of the present invention allow the client 108 to communicate with devices connected to the home network 102 and the cellular network 106 from a remote location. The client 108 establishes a communication link or session to communicate data to the remote repeater 112. The remote repeater 112 in the local network 104 establishes a communication session with the host repeater 110 in the home network 102. The communication session is a connection for transferring data received from the client 108 through the remote repeater 112 to the host repeater 110. The communication session may dedicate resources, such as bandwidth and processing power or functionality to ensuring data is properly sent and received. In one embodiment, the remote repeater 112 and host repeater 110 may use static Internet Protocol addresses to send data during the communication session. In another embodiment, the remote repeater 112 and the host repeater 110 include software for allowing each device to act as a repeater. The repeater software may be used to establish the communication session between the devices and the client 108.

The remote repeater 112 establishes a connection to the host repeater via the wired network 114. The host repeater 110 may require connectivity authorization credentials as normally used in setting up remote access connections. Once the session between the host repeater 110 and the remote repeater 112 is established the wireless repeater function or wireless session may commence.

Depending upon the nature of the repeater function, the remote repeater 112 may need to packetize, encrypt and or otherwise encode the data for transport across the wired network 114. For example, the remote repeater may packetize the data into discrete packets that may be sent across the wired network 114. The packetization of the data may involve adding information, such as a routing address, to a header of each packet so that the packets are routed to the host repeater 110. The host repeater 110 and remote repeater 112 may also have to translate wireless commands by encoding them to control signaling for retransmission. Additionally, all or parts of communication my need to be transmitted in a secure Internet protocol tunnel via encryption methods based on the transmission protocol used.

In one embodiment of the invention the host repeater 110 and remote repeater 112 act as a Code Division Multiple Access (CDMA) repeater. In this scenario, the remote repeater 112 supports base station emulation for receiving data as if it were the cellular carrier and the remote repeater 112 transmits data from the client 108 to the host repeater 110 so that the host repeater 110 may emulate the client, such as a multi-mode cell phone.

The remote repeater 112 may be set up to automatically repeat the client 108. Alternatively, the client 108 may include software whereby a user may choose to repeat the client 108. However, once the client 108 has been chosen for use via the repeaters, the registration information of the client 108 is forwarded to the host repeater 110. The host repeater 110 then emulates the client 108 into the home network 102 and the cellular network 106 and finds all cellular carrier information including existing CDMA carriers and cell sectors currently in use in the area.

After the host repeater 110 finds all used pilot pseudonoise (PN) sequences and/or carriers or channels, the host repeater 110 sends the information to the remote repeater 112 and based on additional information provided at provisioning, the remote repeater 112 may then "flip" to emulating the broadcast tower 118 utilizing the information. The channels available for use may be restricted to specific frequency bands based on regulatory or business requirements. For example, the remote repeater 112 may only be able to use specified frequencies, such as Personal Communications Services (PCS) Band A because that is the only band in the area that the service provider or its partners is authorized to use. In addition, the service provider may have a specific scheme for PN offset assignment. In addition, the remote repeater 112 may need to "tell" the host repeater 110 that it is providing CDMA service so the host repeater 110 may switch to CDMA and find a cell/sector for use.

When the subscriber enables a device, such as client 108, in the coverage area of the remote repeater 112, one of two things may happen. First, if the Preferred Roaming List (PRL) of the client 108 is set up to search for the remote repeater 112, the client 108 will find the remote repeater 112 and continue the process. If the client 108 isn't set up to search for the remote repeater 112, a manual process may be established to force the client 108 to the remote repeater 112 through software on the client 108. For example, the user may elect which of many remote repeaters to connect to using the client 108.

After establishing the remote repeater 112 as its primary "cell", the client 108 proceeds to register with the remote local network 104. The remote repeater 112 takes the normal DMA registration information which may include the cellular identification used by the client 108, the Long PN Code, and encapsulate the information for transmission through the wired network 114 to the host repeater 110, to be reassembled for transmission to its associated cell/sector. The cell/sector will see the transmission from the host repeater 110 as a request from the client 108 and process the access request. The reverse will happen to confirm access and deliver associated information for further processing of voice or data calls.

In another embodiment, the repeater system 100 is set up to repeat a WiFi signal from the client 108 to the remote repeater 112 and then to the host repeater 110 to access the home network 102 or any other WiFi access points in the vicinity of the host repeater 110. This example describes a WiFi repeater, however the same repeater principles can be applied to other IP supporting protocols such as 802.11 and 802.16 protocols. In this example, the host repeater 110 scans for WiFi access points and transmits the list of available networks to the remote repeater 112. The remote repeater stores the list and presents it via a software in the form of a user interface for clients or a provisioning interface that is part of the repeater/WiFi client software.

Next, the client work station 116, or the client 108 attaches to the remote repeater 112 and remote local network 104 the user may access the user interface on repeater 112 and select a WiFi access point or network located at the host repeater site. Once the user has selected an access point, the remote repeater 112 forwards the MAC addressing of the client 108 to the host repeater 100 so the host repeater 100 may emulate the client 108. The remote repeater 112 also takes the addressing provided by the host repeater 110 and emulates the chosen wireless or cellular access point. At this point, all packets addressed to the devices communicating with the host repeater 110 are encapsulated by the remote repeater 112 and transmitted to the host repeater 110 where they are transmitted via the home network 102.

As a result, the client 108 is able to make phone calls to or communicate with the target device 120 even though the client 108 only has access to the remote local network 104 and is not within range of the home network 102. In one embodiment, the target device 120 is a cell phone that communicates using the cellular network 106. However, the target device 120 may be any device suitable for wireless communications. For example, the client 108 may make a local call to the target device 120 in New York even though the wireless user is physically located in Japan accessing the local network 104.

The illustrative embodiments allow the host repeater 110 to transmit data as if the client 108 were present in the home network 102. In one embodiment, the remote repeater 112 may pass registration information from the client 108 which enables the host repeater 110 to send and receive data as if the host repeater 100 were the client 108. The registration information may include a Message Authentication Code (MA) code, Internet Protocol address, password, serial number, telephone number, network key, serial number, telephone number, or any other suitable authorization identifier, scheme, or protocol that the host repeater 110 may use to transmit data in cellular network 106. In another embodiment, the host repeater 110 stores the registration information for when the client 108 is in a remote location. The registration may be manually entered by the wireless user, sent in a message, or otherwise manually or automatically configured on the host repeater 110.

In such a manner, the client 108 is registered on the cellular network 106, despite being at a remote location, so that data may be sent and received from the host repeater 110. For example, the wireless user may be in Thailand without access to a cellular service provider that is based out of the United States. As previously mentioned, the wireless user may also make a phone call to the target device 120 as if the client 108 were physically present within the range of cellular network 106.

Figure 2:
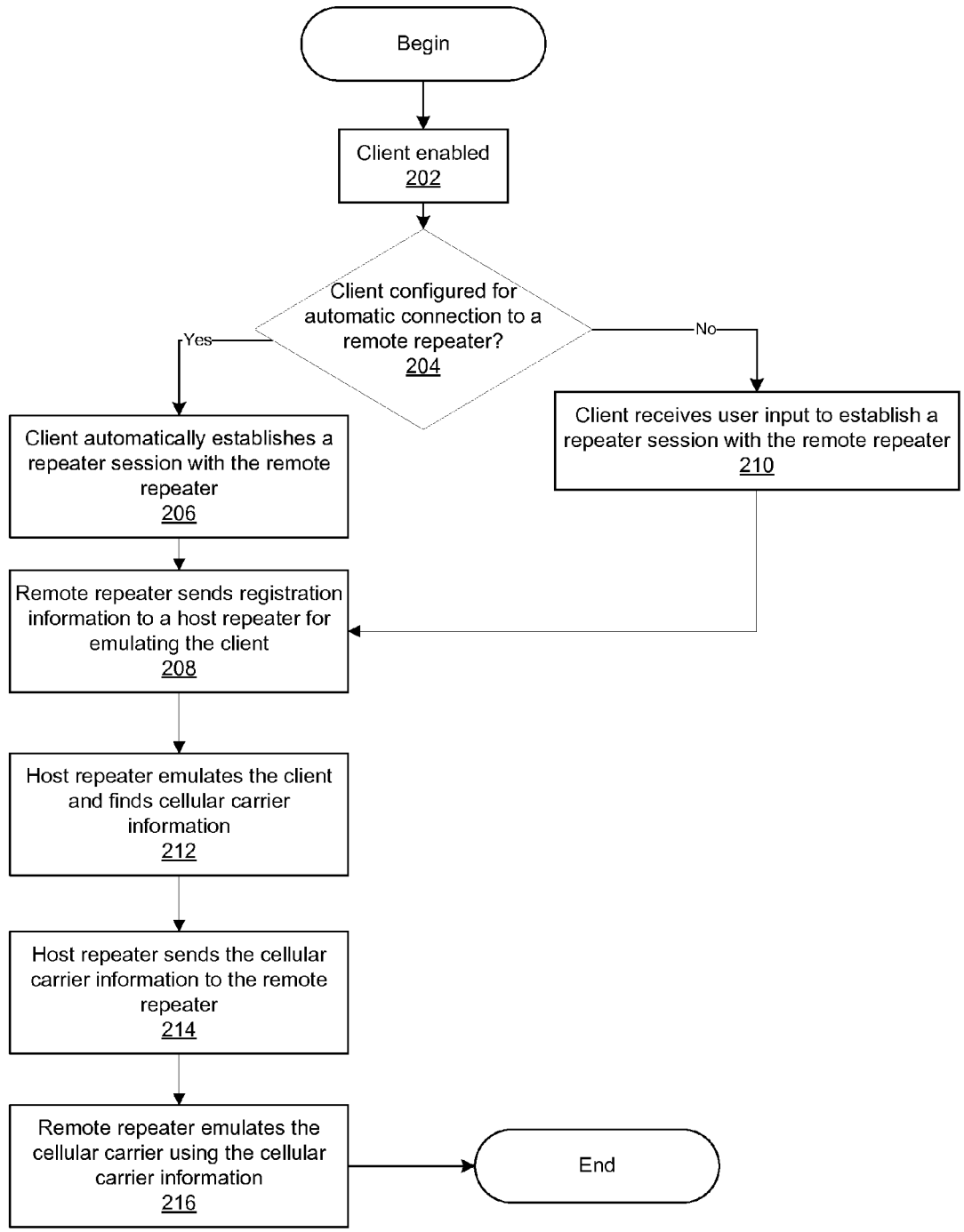
FIG. 2 is a flowchart for a process for repeater communications in accordance with illustrative embodiments of the present invention.

FIG. 2 is a flowchart for a process for repeater communications in accordance with illustrative embodiments of the present invention. The process of FIG. 2 may be implemented by a repeater system. The process begins with the client being enabled (Step 202). The client may be enabled by being turned on or otherwise activated for communications. Next, the process determines whether the client is configured for automatic connection to a remote repeater (Step 204). The determination of Step 204 may be made based on preferences, configuration, or capabilities of the client. For example, the user may have previously configured the client to connect to available remote repeaters as detected. Alternatively, the preferred roaming list of the client may automatically find the remote repeater. If the client is configured for automatic connection to a remote repeater, the client automatically establishes a repeater session with the remote repeater (Step 206).

Next, the remote repeater sends registration information to a host repeater for emulating the client (Step 208). The registration information is the information required by the host repeater to emulate or imitate the client device. The registration information may specify a communications protocol, passwords, client keys, or other information necessary for registering and communicating data.

If the client is not configured for automatic connection to the remote repeater in Step 204, the client receives user input to establish a repeater session with the remote repeater (Step 210). The user input may be manually entered into the client based on the user's preferences or based on a preferred communications configuration. Software running on the client may prompt a user to establish a communication session with the remote repeater. For example, there may be multiple remote repeaters available to the client and the user may select which remote repeater to connect to based on factors, such as compatibility, speed, cost, and coverage.

Next, the remote repeater emulates the client and finds cellular carrier information (Step 212). The cellular carrier information may in elude sequences, channels, carrier or provider, and other information that is used to communicate with the cellular carrier, transceiver, tower, or other network devices. Next, the host repeater sends the cellular carrier information to the host repeater (Step 214). The remote repeater emulates the cellular carrier using the cellular carder information (Step 216). Step 216 allows the client to communicate with the remote repeater as if the remote repeater were a cellular tower in the user's home network. As a result, a user may effectively make a local call from the home network without roaming or added fees even though the user is in a remote location.

Figure 3:
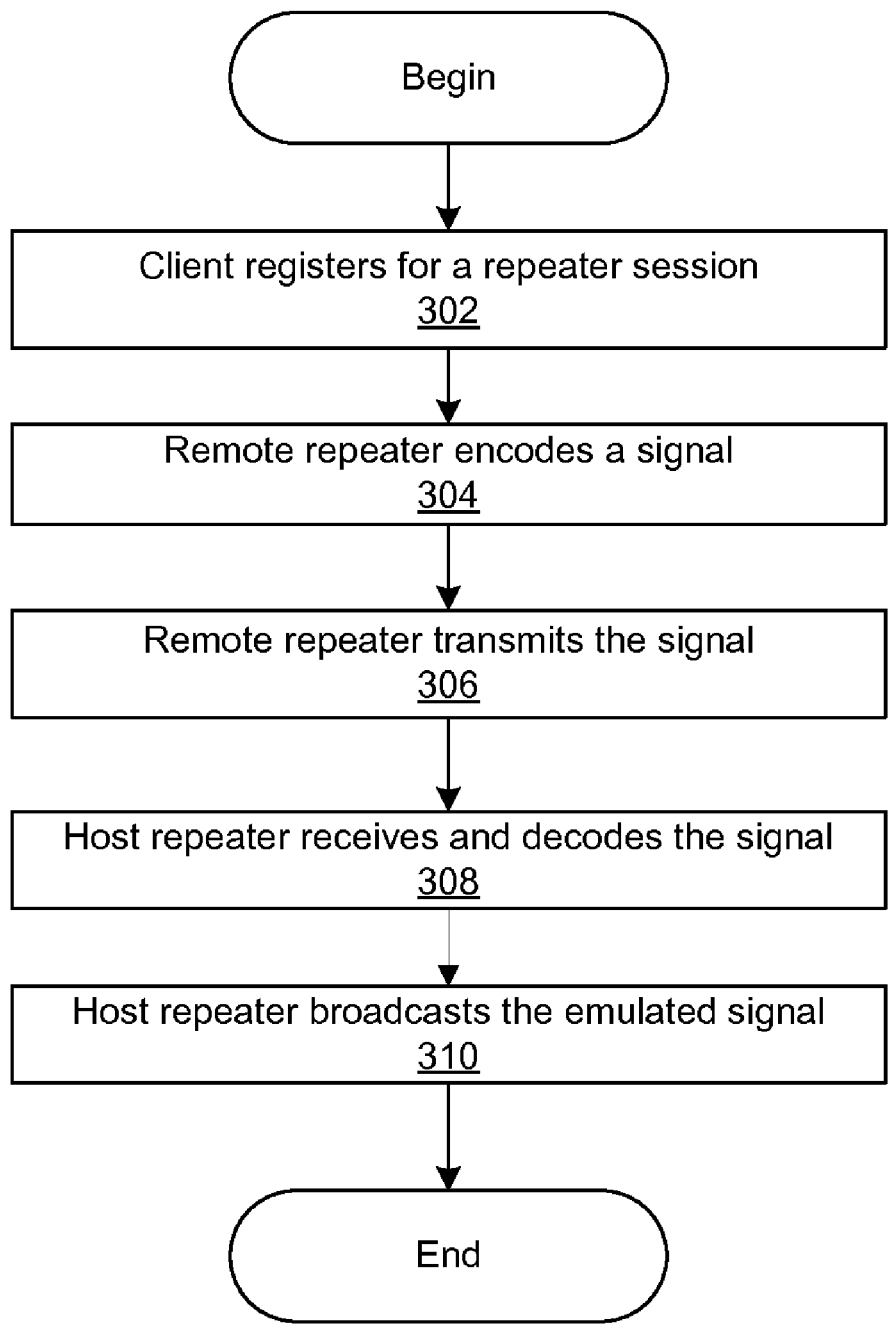
FIG. 3 is a flowchart for a process for broadcasting a signal in accordance with the illustrative embodiments of the present invention.

FIG. 3 is a flowchart for a process for broadcasting a signal in accordance with the illustrative embodiments of the present invention. The process of FIG. 3 may be implemented by a repeater system. The process beings with the client registering for a repeater session (Step 302). One embodiment of the establishment of the repeater session is described in FIG. 2. The repeater session may be established between a client, a remote repeater, a client workstation, a host repeater, one or more cellular carrier devices, and other data processing and communications elements.s.

Next, the remote repeater encodes a signal (Step 304). The signal may be received from the client and may be data, such as a voice conversation or dialing information, or may include registration information for registering the client. The signal may be encoded for transmission across an Internet Protocol network. Additionally, the signal may be encrypted for added security.

Next, the remote repeater transmits the signal (Step 206). The host repeater received and decodes the signal (Step 308). The signal may need to be decoded or unencrypted into a different form. For example, the signal may need to be decoded from an Internet Protocol packet to a signal that may be broadcast to a cellular carrier. Next, the host repeater broadcasts the emulated signal (Step 310) with the process terminating thereafter. The signal is sent in Step 310 from the remote repeater on behalf of the client. As a result the client may send and receive data as if the client were present in the home network.

Figure 4:
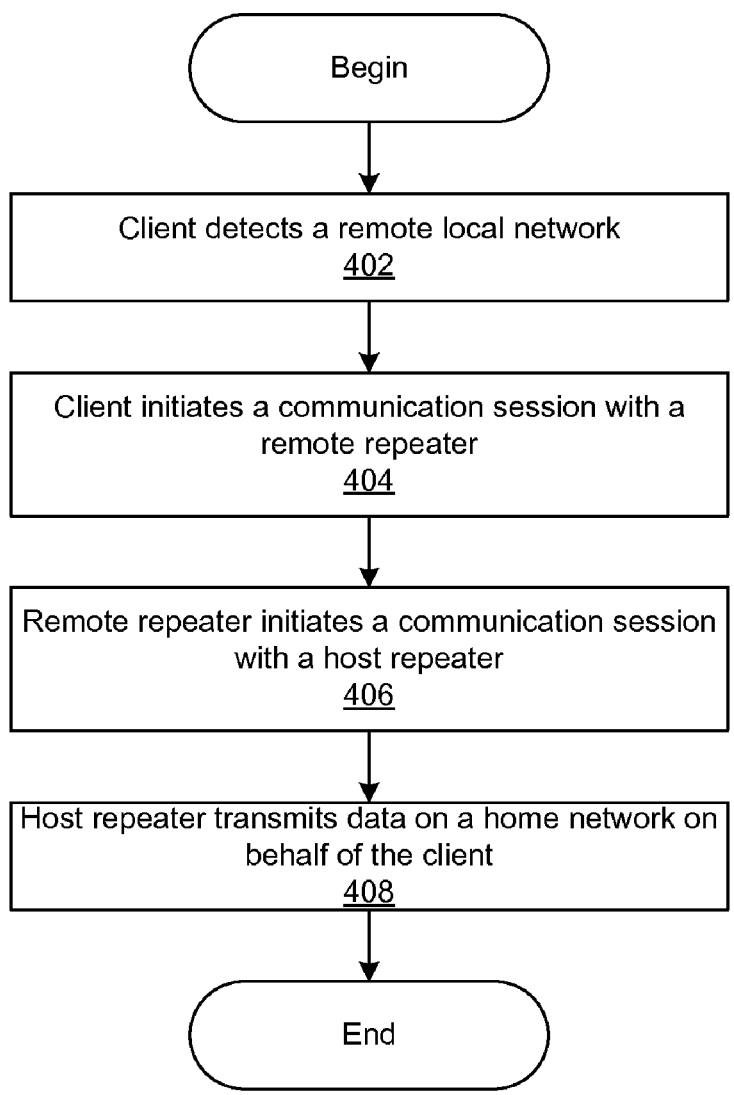
FIG. 4 is a flowchart for a process for using repeater communications remotely in accordance with illustrative embodiments of the present invention.

FIG. 4 is a flowchart for a process for using repeater communications remotely in accordance with illustrative embodiments of the present invention. The process of FIG. 4 may be implemented by a cell phone repeater system. The process begins with the client detecting a remote local network (Step 402). The remote local network may be a local data network that is available from a public provider. However, the remote local network may require a subscription, fee, password or other authentication to allow communication. The remote local network may be detected by a cell phone, personal digital assistant, or other device. In one embodiment, the client is automatically configured to detect wireless networks and provide the wireless user information, such as availability, cost, compatibility, and security.

Next, the client initiates a communication session with a remote repeater (Step 404). The remote repeater may be stand-alone or integrated with a laptop or other device, such as a client work station. The communication session of Step 404 may be instigated by a wireless user based on the unavailability of a cellular network for standard communications. For example, the wireless user may initiate the communication session because cellular access is insufficient to make a phone call. Alternatively, the client may automatically initiate the communication session when communications functions of the client are selected.

Next, the remote repeater initiates a communication session with a host repeater (Step 406). The communication session may be established through a software interface, static Internet Protocol addresses, or other session interface or protocol. The communication sessions of Step 404 and Step 406 are initiated to ensure that bandwidth, memory, processing power, or other resources of the client, remote repeater and host repeater are dedicated to communication between the devices for ensuring that real time or non-real time data is transferred efficiently. Step 406 may involve sending and receiving registration information and cellular carrier information for the client between the repeaters.

Next, the host repeater transmits data on a home network on behalf of the client (Step 408), with the process terminating thereafter. For example, the host repeater may emulate a cell phone for making and receiving data during a phone call.

Figure 5:
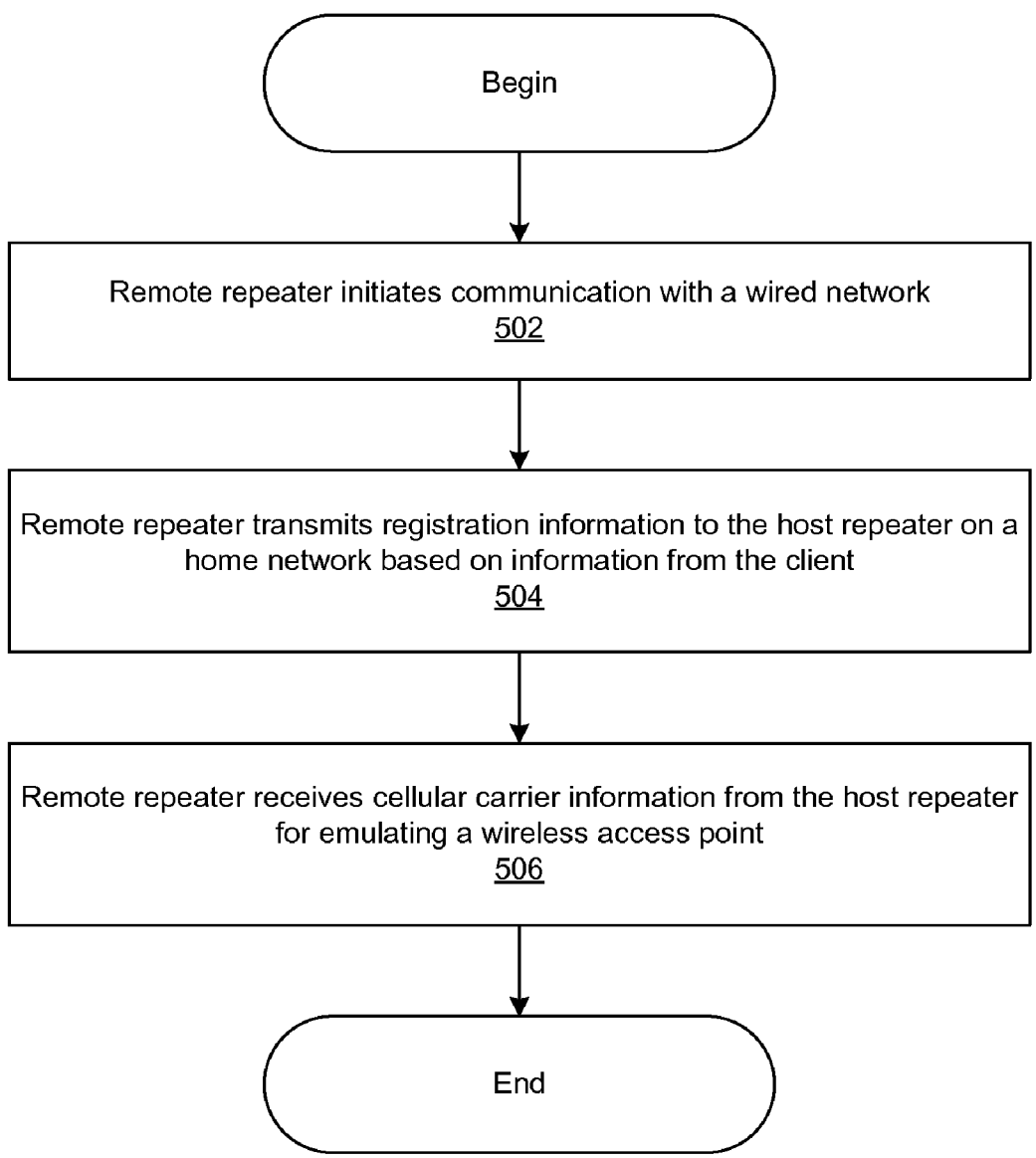
FIG. 5 is a flowchart for a process for using a host repeater for communications in accordance with illustrative embodiments of the present invention.

FIG. 5 is a flowchart for a process for using a host repeater for communications in accordance with illustrative embodiments of the present invention. The process of FIG. 5 is a more detailed explanation of steps 404-408 of FIG. 4. The process of FIG. 5 may be implemented by a remote repeater. The process begins by initiating communication with a wired network (Step 502). In one embodiment, the wired network is the Internet or other Internet Protocol network. The wired network may be any number or combinations of public and private networks.

Next, the remote repeater transmits registration information to the host repeater on a home network based on information from the client (Step 504). The registration information allows the host repeater to emulate the client. The registration information includes data, protocols, passwords, keys, numbers, or addresses for communicating with a cellular network.

Next, the remote repeater receives cellular carrier information from the host repeater for emulating a wireless access point (Step 506) with the process terminating thereafter. The cellular carrier information allows the remote repeater to act as a wireless access point, such as a cellular broadcast tower for sending and receiving communications from the client during a repeater session. Step 506 allows the remote repeater to act as the client's receiver and transmits all packets to the host repeater. Because the remote repeater acts as the client' receiver, the client may communicate using an available network connection. For example, if the client is in a mountainous region where normal cellular communications is unavailable, the client may access a network that is available to make calls through the home network.

Figure 6:
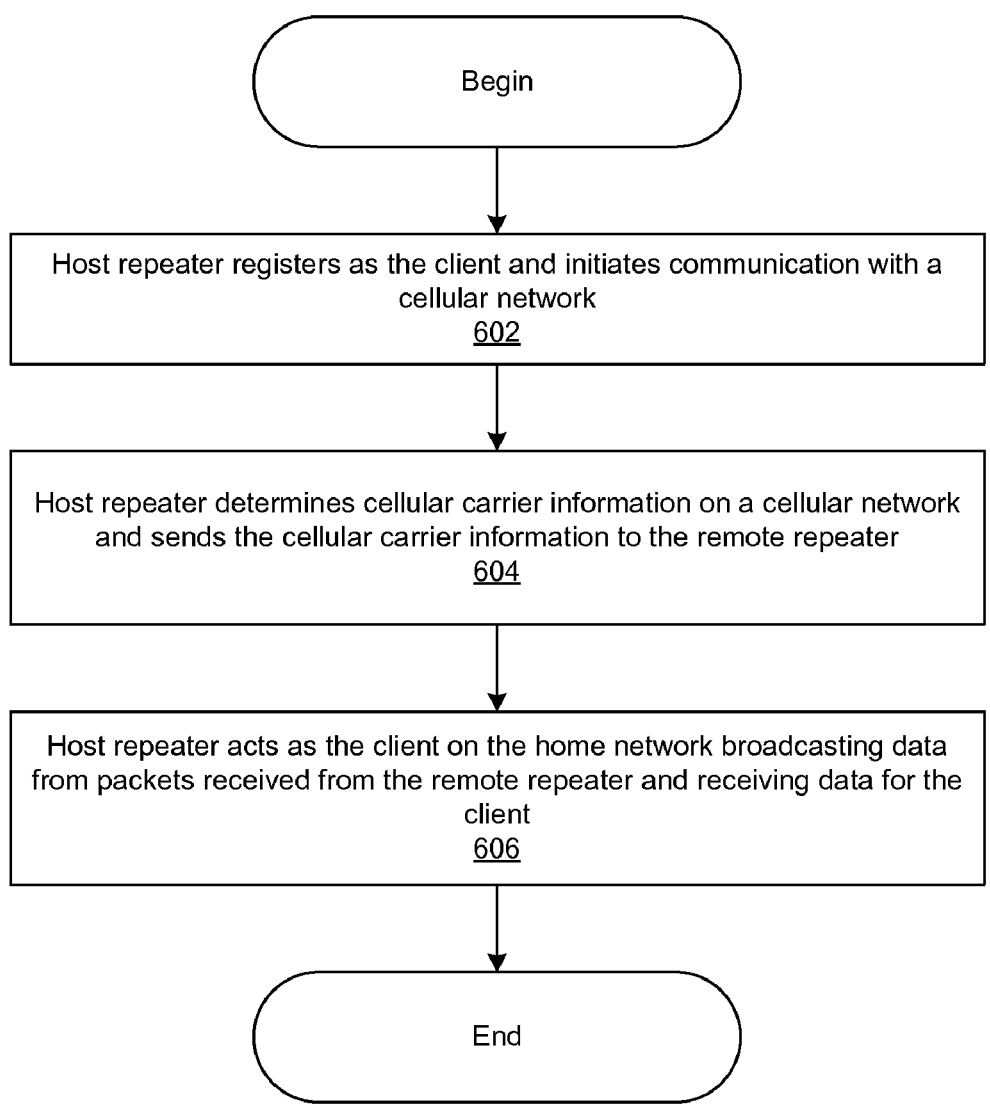
FIG. 6 is a flowchart for a process for using a remote repeater for communications in accordance with illustrative embodiments of the present invention.

FIG. 6 is a flowchart for a process for using a remote repeater for communications in accordance with the illustrative embodiments of the present invention. In one embodiment, a software program installed on the host repeater implements the process described in FIG. 6. The process of FIG. 6 is a more detailed explanation of Steps 406 and 408 of FIG. 4. The process of FIG. 6 may be implemented by a host repeater. The process begins by registering as the client and initiating communication with a cellular network (Step 602). During Step 602, the host repeater is registered as the client device for transmitting data on behalf of the client. The registration information may be an identifier, a script, code, or protocol that the client uses to register itself with the cellular network.

For example, the registration information may have been sent by the client device or may have been previously stored on the host repeater for situations when the client is out of range of the cellular network. Step 602 may be implemented in response to a remote repeater contacting the host repeater in Step 502 of FIG. 5.

Next, the host repeater determines cellular carrier information on a cellular network and sends the cellular carrier information to the remote repeater before entering repeat mode (Step 604). The cellular carrier information allows the remote repeater to emulate a cellular broadcast tower or other wireless transceiver. Next, the host repeater acts as the client on the cellular network broadcasting data from packets received from the remote repeater and receiving data for the client (Step 606) with the process terminating thereafter.

Figure 7:
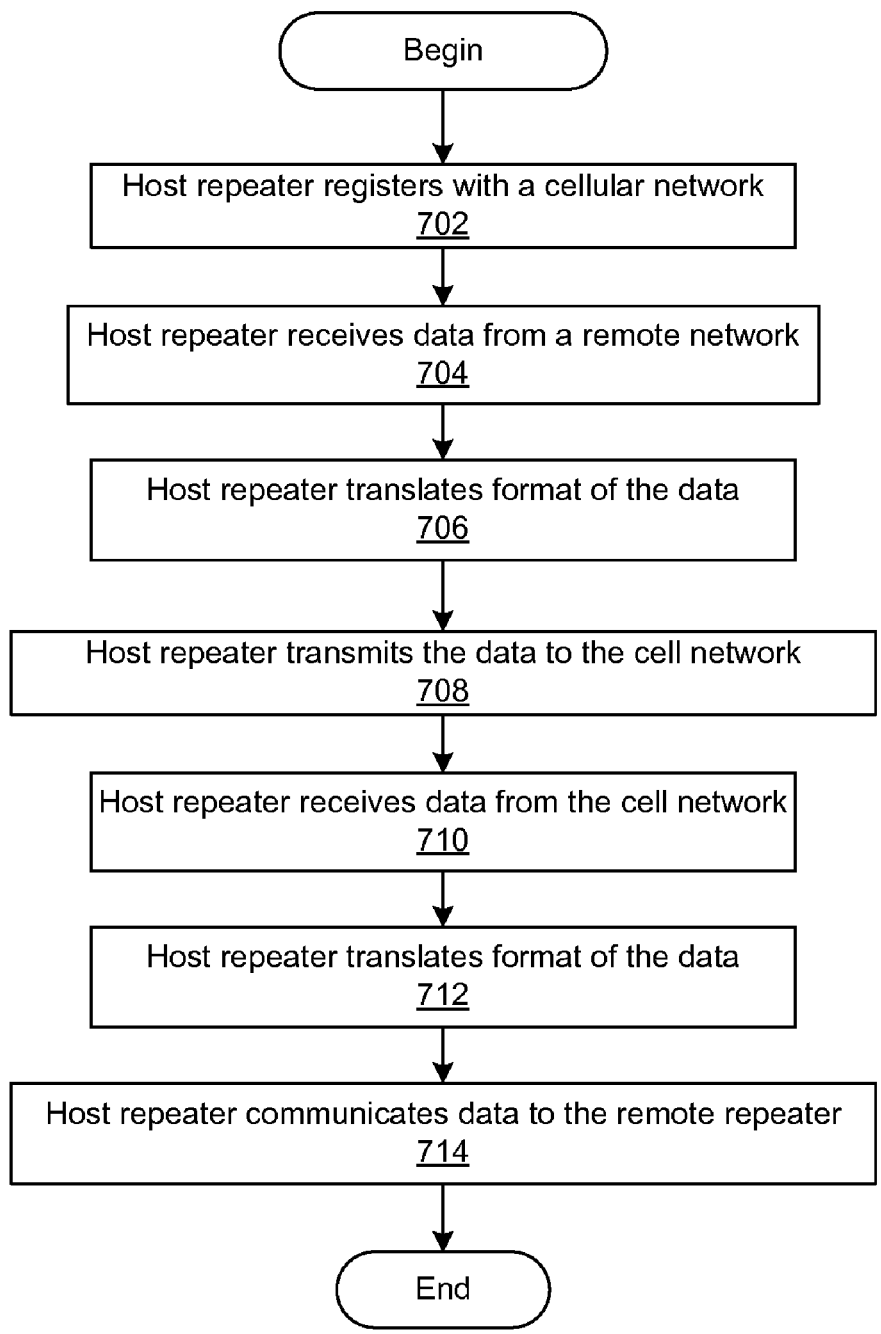
FIG. 7 is a flowchart for a process for using a host repeater for cellular communications in accordance with the illustrative embodiments of the present invention.

FIG. 7 is a flowchart for a process for using a host repeater for cellular communications in accordance with the illustrative embodiments of the present invention. The process of FIG. 7 may be implemented by a host repeater in a repeater system. The process begins by registering with a cellular network (Step 702). The cellular network may be a network frequently used by a wireless user. For example, the cellular network may be the home cellular network that the wireless user uses to make calls at home and at work. The host repeater registers by sending data that the cell phone would send to register itself if the cell phone were present at the location of the host repeater. The data may include identification codes, passwords, and other handshake protocols used to interface a wireless device with a service network.

Next, the host repeater receives data from a remote network (step 704). The data may intermediately be passed through various wired or wireless networks before reaching the host network. In one embodiment, the remote network may be located in the same location as a remote wireless user. For example, the remote wireless user may access an 802.11g network in an airport in Argentina.

Next, the host repeater translates the format of the data (Step 706). In one embodiment, the host repeater translates the format of the data from packets that are easily transferable over the Internet to voice packets communicable over a cellular network. However, the translation may be between any number of voice and data protocols suitable for transferring information.

Next, the host repeater transmits the data to the cell network (Step 708). During Step 708, the data is effectively passed to the cell network to be broadcast or transmitted. For example, the data may be part of a phone call that is being passed through the host repeater. By transmitting the data to the cell network, the host repeater allows the cellular footprint to be effectively expanded to the location of a remote wireless user. Next, the host repeater receives data from the cell network (step 710). The data received in Step 710 may be part of a conversation that is being transmitted from a wireless user with communication access to the cellular network to the remote wireless user. Next, the host repeater translates the format of the data (Step 712). In the ongoing example, the host repeater may translate the format of the data from voice packets to Internet protocol packets. This may involve any number of packetization processes including adding or modifying a header, routing information, or other relevant protocol data.

Next, the host repeater communicates data to the remote repeater (step 714) with the process terminating thereafter. The remote repeater may further route data to a wireless device used by the remote wireless user. For example, the remote repeater may transmit the data to a cellular phone accessing the remote repeater.

The previous detailed description is of a small number of embodiments for implementing the invention and is not intended to be limiting in scope. One of skill in this art will immediately envision the methods and variations used to implement this invention in other areas than those described in detail. The following claims set forth a number of the embodiments of the invention disclosed with greater particularity.

What is claimed:

1. A method for communicating through a host repeater, said method comprising:
   receiving data from a remote repeater communicating with a wireless device;
   registering the host repeater as the wireless device on a wireless network; and
   reformatting the data for transmission between the wireless device and the wireless network; wherein the reformatting step further comprises: encapsulating the data into packets; and modifying header information, the header information being operable to be used to route the packets; comprising, encoding the data to form packets, wherein the packets are communicated across the Internet between the remote repeater and the host repeater; the wireless network is any of a wireless local area network (LAN), a cellular telephony network, and a wireless wide area network WAN).

2. The method according to claim 1, further comprising, detecting a local wireless network available to the wireless device for communicating with the remote repeater.

3. The method according to claim 2, further comprising, establish a communication session between the wireless device and the remote repeater for transferring the data; and
   establishing a communication session between the remote repeater and the host repeater over a wired network for transferring the data.

4. The method according to claim 1, wherein the wireless network is a cellular network that is outside a range of the wireless device.

5. The method according to claim 1, wherein the wireless device is a cell phone.

6. The method according to claim 1, wherein the registering step is performed based on registration information used by the wireless device to register with the wireless network.

7. The method according to claim 1, and further comprising:
   emulating a wireless access point, wherein the remote repeater emulates the wireless access point operable to receive the darn from the wireless device; and
   emulating the wireless device, wherein the host repeater functions as a repeater for sending and receiving data between the wireless network and the wireless device.

8. The method according to claim 1, further comprising:
   determining wireless carrier information, the wireless carrier information being operable to be used by the remote repeater to emulate a wireless access point.

9. The method according to claim 1, wherein the registration information is any of Internet protocol address, Message Authentication Code (MAC) code, serial number, telephone number, password and network key.

10. A system for communicating through a remote repeater, said system comprising:
    a remote repeater operable to communicate with a client over a fit wireless network, the remote repeater emulating a wireless access point configured to communicate with the client, wherein the remote repeater is operable to convert data received from the client from a first format to a second format; and a host repeater operable to communicate with the remote repeater over a wired network, communicate with a cellular network over a second wireless network, receive the packets from the remote repeater, and convert the data from the second format to the first format, wherein the host repeater is operable to emulate the client and transmit the data to the cellular network wherein the reformatting step further comprises:

encapsulating the data into packets; and modifying header information, the header information being operable to be used to route the packets.

11. The system according to claim 10, wherein the data is a voice signal.

12. The system according to claim 10, and further comprising:

the client, wherein the client is operable to detect access to a local network for communicating with the remote repeater.

13. A method for communicating through a host repeater, said method comprising:

receiving a session request from a remote repeater, wherein the remote repeater communicates with a wireless device through a first wireless network;

registering the host repeater as the wireless device on a second wireless network using registration information associated with the wireless device; and communicating data from the host repeater to the remote repeater over a wired network further comprising:

converting data from a first format to a second format, the converted data being communicated from the host repeater over the second wireless network to the wireless device and the home network; wherein the converting step further comprises: unencapsulating the data from packets compatible with an Internet protocol for sending the data across the wired network.

14. The method according to claim 13, wherein the communicating step further comprises, facilitating two-way communication between the wireless device and a target device communicating through the second wireless network.

15. The method according to claim 13, wherein the host repeater emulates the wireless device for sending and receiving information from a wireless access point and the remote repeater emulates the wireless access point for receiving data from the wireless device.

* * * * *